United States Patent
Choquette et al.

(10) Patent No.: US 6,311,292 B1
(45) Date of Patent: Oct. 30, 2001

(54) CIRCUIT, ARCHITECTURE AND METHOD FOR ANALYZING THE OPERATION OF A DIGITAL PROCESSING SYSTEM

(75) Inventors: Jack H. Choquette, Los Altos; Donald W. Smith, Santa Clara, both of CA (US)

(73) Assignee: SandCraft, Inc., Santa Clara, CA (US)

( * ) Notice: Subject to any disclaimer, the term of this patent is extended or adjusted under 35 U.S.C. 154(b) by 0 days.

(21) Appl. No.: 09/126,680

(22) Filed: Jul. 30, 1998

(51) Int. Cl.[7] ..................................................... G06F 11/00

(52) U.S. Cl. ............................................... 714/30; 714/31

(58) Field of Search ............................... 714/31, 30, 733, 714/23, 25, 734

(56) References Cited

U.S. PATENT DOCUMENTS 5,497,456 * 3/1996 Alexander ............................ 714/29
5,983,017 * 11/1999 Kemp ................................... 717/4

* cited by examiner

Primary Examiner—Robert Beausoleil
Assistant Examiner—Bryce P. Bonzo
(74) Attorney, Agent, or Firm—Blakely, Sokoloff, Taylor & Zafman

(57) ABSTRACT

A dual access debugging architecture. This architecture allows the microprocessor to select between external debugging, supported via the physical system interface, and internal debugging, supported via logic within the microprocessor which is controlled by decoded software instructions.

In one example of the present invention, a microprocessor includes a system bus interface and a program decoder which is coupled to the system bus interface. The system bus interface is coupled to a system bus to which external memory is coupled. Debugging operations are stored as debugging instructions in the external memory. When these debugging instructions are retrieved from memory, through the system bus and the system bus interface, they are decoded in the program decoder of the microprocessor and they in turn cause the microprocessor to enter a first debugging mode which is controlled by the debugging instructions. The first debugging mode may be referred to as an internal programmable method. The microprocessor also includes a dedicated test port, such as a JTAG port, which provides signals to and from registers and other logic in test port logic on the IC (integrated circuit) of the microprocessor. The dedicated test port includes input/output pins on the microprocessor which convey the test signals to external test logic device, such as JTAG test equipment. Testing of the microprocessor using the dedicated test port involves asserting a signal in the test port which causes the microprocessor to enter a second debugging mode which is controlled by the external test logic device. This second debugging mode may be referred to as an external debug method.

17 Claims, 6 Drawing Sheets

CIRCUIT, ARCHITECTURE AND METHOD FOR ANALYZING THE OPERATION OF A DIGITAL PROCESSING SYSTEM

FIELD OF THE INVENTION

The present invention relates to debugging operations for a microprocessor.

BACKGROUND

Designers have attempted to keep microprocessor debugging techniques apace with the faster microprocessors. As a result, these debugging methods have had to undergo recent change. For example, functions that were once a part of separate emulator tools have been integrated into the processor itself. This has alleviated the often difficult task of emulating the various processor types in order to perform simple debugging operations. Most microprocessors are caused to enter a debugging mode through software instructions which are provided to the microprocessor from external memory which is coupled to the microprocessor by a system bus. These software instructions are received by the microprocessor and decoded by a decoder in the microprocessor, and the decoded instruction causes the microprocessor to enter the debugging mode and to perform debugging operations in the manner specified further by the software instructions. This type of microprocessor thus typically requires no extra input or output pins to accommodate these debugging operations because the input and output to/from the microprocessor is through the microprocessor's system bus interface. Thus, this type of microprocessor is generally preferred and may be referred to as an internal programmable debug method.

Some logic devices, such as complex programmable logic devices, have used a different mechanism for entering and performing debugging mode by using a dedicated test port having its own set of dedicated input/output pins on the logic device. One such example is the Joint Test Action Group (JTAG) IEEE 1149.1 Standard which describes a dedicated test port for a logic device. The method of using an external, dedicated test port to debug a logic device may be referred to as an external debug method.

In order to permit users to test a processor without having to purchase specialized debugging tools, it is desirable to offer a microprocessor that offers the advantages of external, dedicated test access port debugging as well as internal programmable methods. Furthermore, it is beneficial to create a microprocessor with an open architecture, so that a user may select from a broad range of microprocessor debugging standards, be it JTAG or internal programmable method or any other standard.

SUMMARY OF THE INVENTION

Described herein is a microprocessor, a computer architecture and a method that allows dual access to debugging operations. In one embodiment, the present invention provides a method of interrupting normal microprocessor operation and performing a debugging operation on the microprocessor. This debugging operation may be either through an internal programmable method or through an external dedicated test port to the microprocessor, depending on which mode is selected. Furthermore, both the internal or external debugging modes may be interrupted. This may occur, for example, after the debugging operation is complete. In any case, the microprocessor may resume normal operation after the debugging operation is interrupted.

In one example of the present invention, a microprocessor includes a system bus interface and a program decoder which is coupled to the system bus interface. The system bus interface is coupled to a system bus to which external memory is coupled. Debugging operations are stored as debugging instructions in the external memory. When these debugging instructions are retrieved from memory, through the system bus and the system bus interface, they are decoded in the program decoder of the microprocessor and they in turn cause the microprocessor to enter a first debugging mode which is controlled by the debugging instructions. The first debugging mode may be referred to as an internal programmable method. The microprocessor also includes a dedicated test port, such as a JTAG port, which provides signals to and from registers and other logic in test port logic on the IC (integrated circuit) of the microprocessor. The dedicated test port includes input/output pins on the microprocessor which convey the test signals to an external test logic device, such as JTAG test equipment. Testing of the microprocessor using the dedicated test port involves asserting a signal in the test port which causes the microprocessor to enter a second debugging mode which is controlled by the external test logic device. This second debugging mode may be referred to as an external debug method.

In another embodiment, normal microprocessor operation may be interrupted after comparing an established preset value to a present value. As a result, depending on the result of such comparison, normal microprocessor operation may be interrupted for subsequent debugging operations. For example, the preset value may be an instruction stored in a predetermined address register. When the present value is determined, for example, by the microprocessor executing the same instruction that is stored in the predetermined address register, normal microprocessor operation may be interrupted. Alternatively, normal microprocessor operation may be interrupted when the instruction stored in the predetermined register and the instruction executed by the microprocessor are not the same.

In another embodiment, normal microprocessor operation may be interrupted after comparing a preset value, comprising a stored data signal, to a present value, comprising a data signal being read or written. For example, the preset value may be a data value stored in a predetermined address register. When the present value is determined, for example, by the microprocessor reading the data stored in the predetermined address register, normal microprocessor operation may be interrupted. Alternatively, normal microprocessor operation may be interrupted when the data stored in the predetermined address register is being accessed and overwritten.

In another embodiment, the present invention may select either internal debugging operation or external debugging operation, depending on a preset condition. For example, if the preset condition places a debug module in a reset state, the internal debugging operation may be selected. The internal debugging features may be compatible with an N-Wire or N-Trace standard from Hewlett-Packard of Palo Alto, Calif. Also, if the preset condition places the debug module in a non-reset state, the external debugging operation may be selected. Furthermore, the external debugging operation may be accessed by a test port which may be compatible with JTAG IEEE 1149.1 standard.

In yet another embodiment, the present invention provides a microprocessor coupled to a physical system interface that permits debugging external to the microprocessor unit. This external debugging interface may comprise an access port compatible with JTAG IEEE 1149.1 standard. In addition, the present invention includes a programmable logic circuit, internal to said microprocessor, that permits the microprocessor to be debugged by decoding and executing software instructions which are received by the microprocessor from external memory through a system bus interface. The present invention also includes a debug module, coupled between the microprocessor and the physical system interface, which contains logic necessary to select between the external and internal debugging operations. For example, when the debug module is in a reset state it may direct the microprocessor to perform an internal debugging operation.

BRIEF DESCRIPTION OF THE DRAWINGS

The present invention is illustrated by way of example and not limitation in the figures of the accompanying drawings in which.

DETAILED DESCRIPTION

Described herein is a microprocessor and computer architecture and method that allows dual access to debugging operations. In one embodiment, the present invention provides a method of interrupting normal microprocessor operation and performing a debugging operation on the microprocessor. This debugging operation may be either a first mode or a second mode, depending on which mode is selected. Furthermore, both debugging modes may be interrupted. This may occur, for example, after the debugging operation is complete. In any case, the microprocessor may resume normal operation after the debugging operation is interrupted.

Figure 1A:
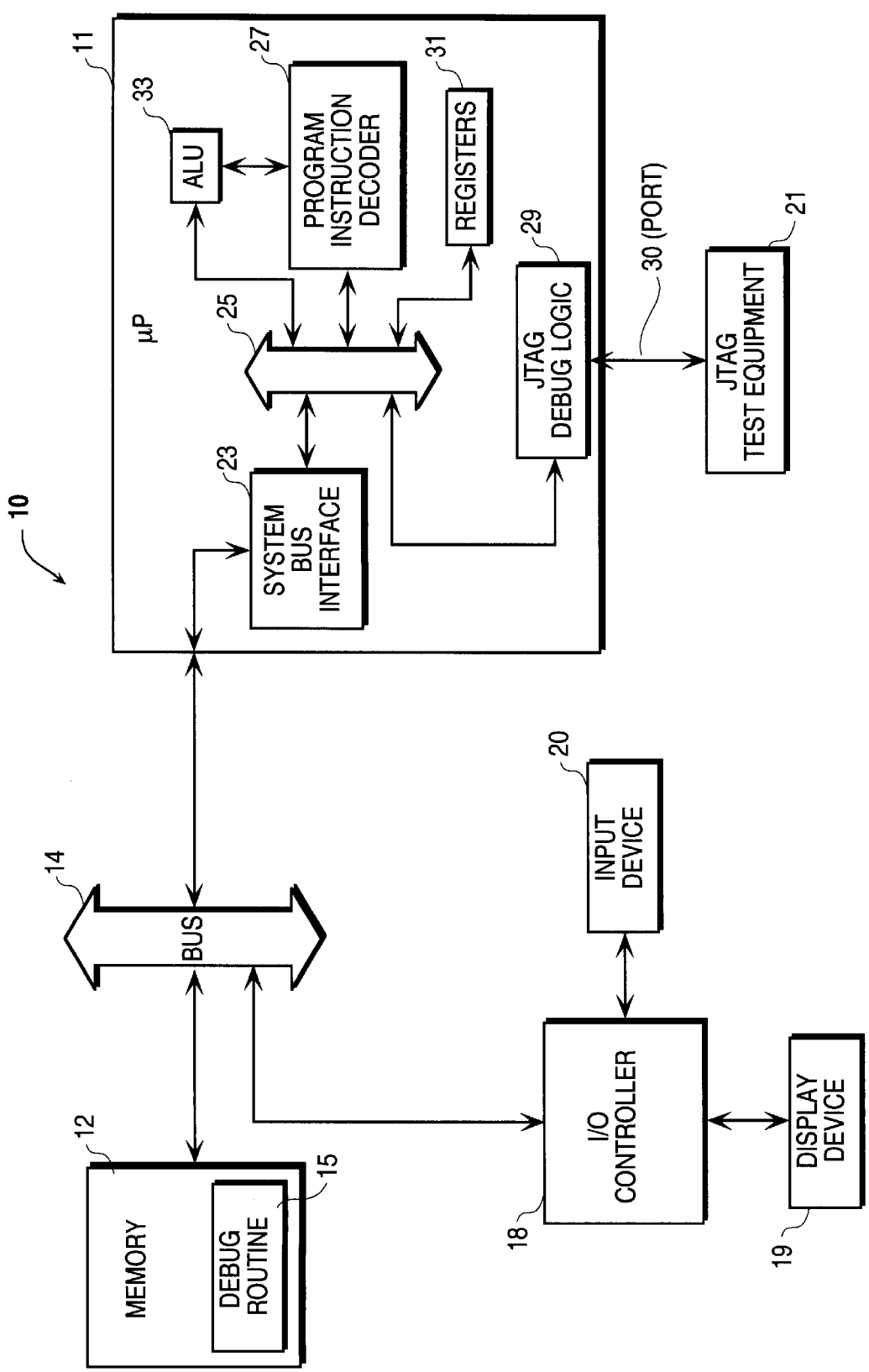
FIG. 1A illustrates a computer architecture of one embodiment of the present invention.

FIG. 1A shows one example of a microprocessor 11 which uses the present invention. The microprocessor is shown in a computer system 10 which uses the present invention. The microprocessor 11 is coupled to external memory 12 (e.g. RAM or cache memory) through a bus 14 which may be referred to as a system bus in certain embodiments. An Input/Output (I/O) controller 18 is shown in block diagram form and provides a conventional interface between an I/0 device and the memory 12 and microprocessor 11 through the bus 14 to which the controller 18 is coupled. The I/O controller 18 supports I/O with at least one input device 20 (e.g. a keyboard or buttons or a mouse or a combination of these) and supports I/O with at least one output display device 19 such as a printer or a CRT or a liquid crystal display device. A JTAG test equipment 21 is coupled to a dedicated test port 30 on the microprocessor 11.

The memory 12 stores software instructions 15 which, when executed by the microprocessor 11, cause the microprocessor to enter a debugging mode and to perform debugging operations which are specified by the software instructions 15. These software instructions 15 are typically retrieved by the microprocessor 11 when it addresses the memory 12 to obtain the instructions which are loaded into the microprocessor through the bus 14 and system bus interface 23 and the internal bus 25. A portion (or all) of instructions 15 may be stored in the microprocessor 11 in an instruction cache, and they may be stored at least temporarily in registers 31 of the microprocessor. Each instruction in the instructions 15 is decoded by a program instruction decoder 27 which is coupled to the internal bus 25 and to an arithmetic logic unit (ALU) 33. The decoded instruction specifies an action by the microprocessor 11 usually by causing the ALU 33 to perform an operation on data stored in the registers 31. When the decoded instruction specifies that the microprocessor 11 is to enter a debug mode, normal operation of the processor is halted while the debugging operations specified by the software instructions 15 are performed.

The microprocessor 11 may enter debug mode by a user's control of the JTAG test equipment 21 which is designed to allow the user to test the operation and status of the microprocessor 11 through the test port 30. The JTAG debug logic 29 is coupled to test port 30 and serves to receive JTAG input signals from the JTAG test equipment 21 and to provide output data to this equipment 21. The JTAG debug logic 29 is shown coupled to the internal bus 25 in order to exchange data with the registers 31 and data and instructions with the ALU 33. The implementation shown here is one example of a combination of a dedicated test port with a microprocessor which also has a programmable debug mode.

Figure 1B:
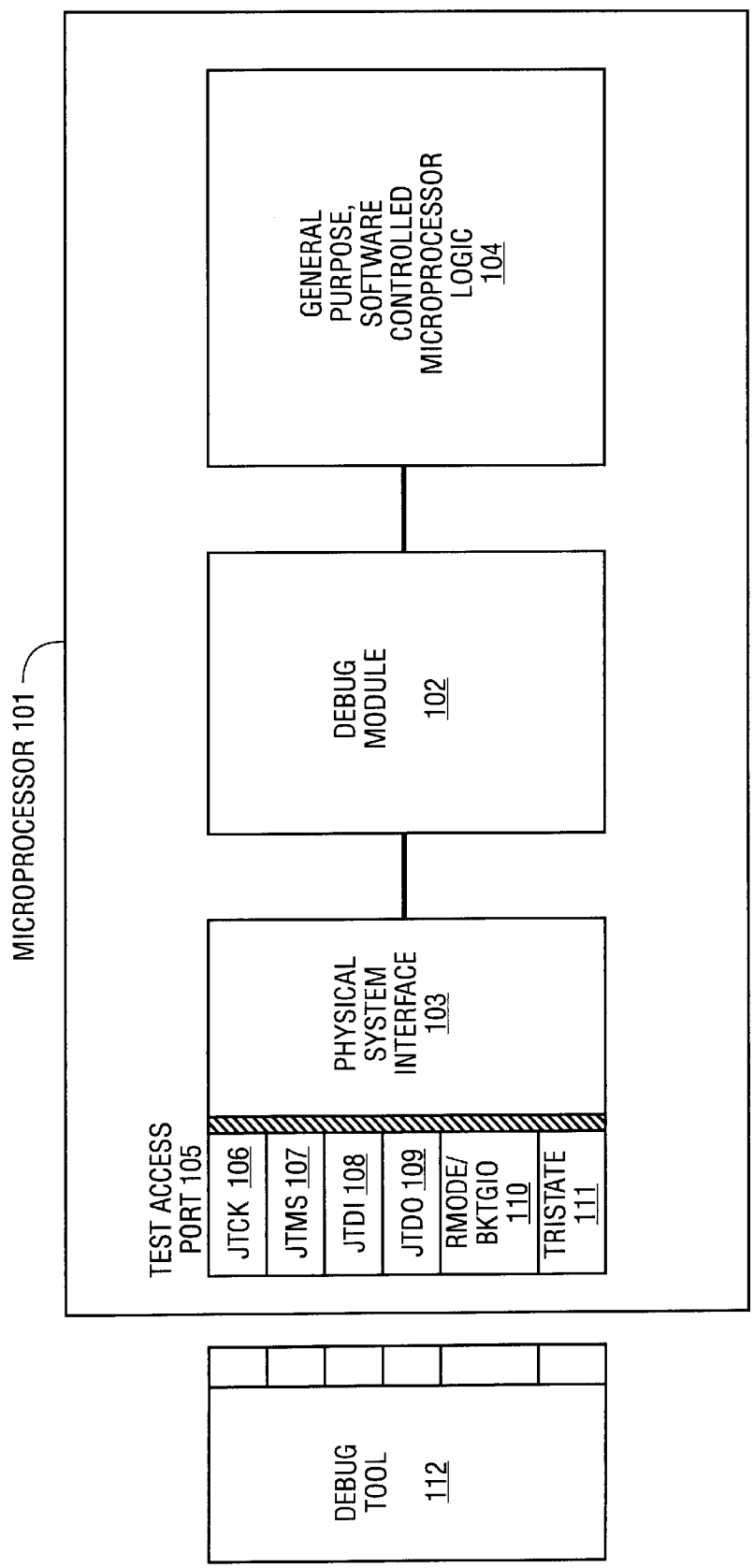
FIG. 1B illustrates a microprocessor which uses a debug module coupled to a physical system interface and programmable logic to accomplish dual access debugging operations.

FIG. 1B illustrates a microprocessor 101 which includes a dual access debugging architecture in accordance with one embodiment of the present invention. Debug module 102 is coupled to the general purpose, software controlled microprocessor logic 104 of the microprocessor 101 and is coupled to physical system interface 103. The physical system interface 103 is coupled to test input/output connections of the microprocessor 101, and these test I/O connections are shown as test access port 105 in FIG. 1B. Typically, the test access port 105 will include a plurality of bonding pads on a semiconductor substrate (an "integrated circuit") which includes the logic 104 and the physical system interface 103 and the debug module 102 all disposed on this substrate. In one implementation of a microprocessor, the logic 104 may include the ALU 33, decoder 27, registers 31, internal bus 25 and system bus interface 23 as shown in FIG. 1A.

The configuration illustrated in FIG. 1B allows microprocessor 101 to have access to two debugging modes. Logic 104 offers internal debugging capabilities through decoded software instructions obtained from memory as described above and physical system interface 103 provides external debugging capabilities through test access port 105. Determining which mode will be accessed depends, in one embodiment, on the state of debug module 102. For example, a preset condition or user input may place debug module 102 in a reset state such that microprocessor 101 is directed to use programmable logic 104 to perform debug. Furthermore, a preset condition or user input may place debug module 102 in a non-reset state such that microprocessor 101 is directed to use physical system interface 103 to perform debug. Allowing microprocessor 101 to be debugged externally, via physical system interface 103 and its test access port 105, ensures continued compatibility with accepted debugging standards, like Hewlett-Packard's N-Wire standard. This also allows users to continue using emulators and other debugging tools previously available.

As shown in FIG. 1B, test access port 105, attached to physical system interface 103, allows any existing debug tool 112 (which is compatible with the test port 105) to debug microprocessor 101. In one embodiment, test access port 105 has connection pins compatible with JTAG IEEE 1149.1 standard. For example, test access port 105 may provide JTCK pin 106 that allows the processor to accept a clock asynchronous to the processor and JTMS pin 107 that allows external debug tool 112 to control debug operations. In addition, JTDI pin 108 and JTDO pin 109 allow data to be scanned in and out, respectively, from debug tool 112 to microprocessor 101. RMODE/BKTGIO pin 110 has two functions. First, under RMODE condition, when the processor is first booted it allows debug module 102 to be sampled in order to determine its reset/non-reset state. Second, under the BKTGIO condition, a bi-directional signal is used to break microprocessor's 101 normal operation from an external debug tool 112, or to allow microprocessor 101 to trigger an external debug tool 112. Finally, a signal on TRISTATE pin 111 allows all processor outputs to be isolated for test purposes.

Figure 2:
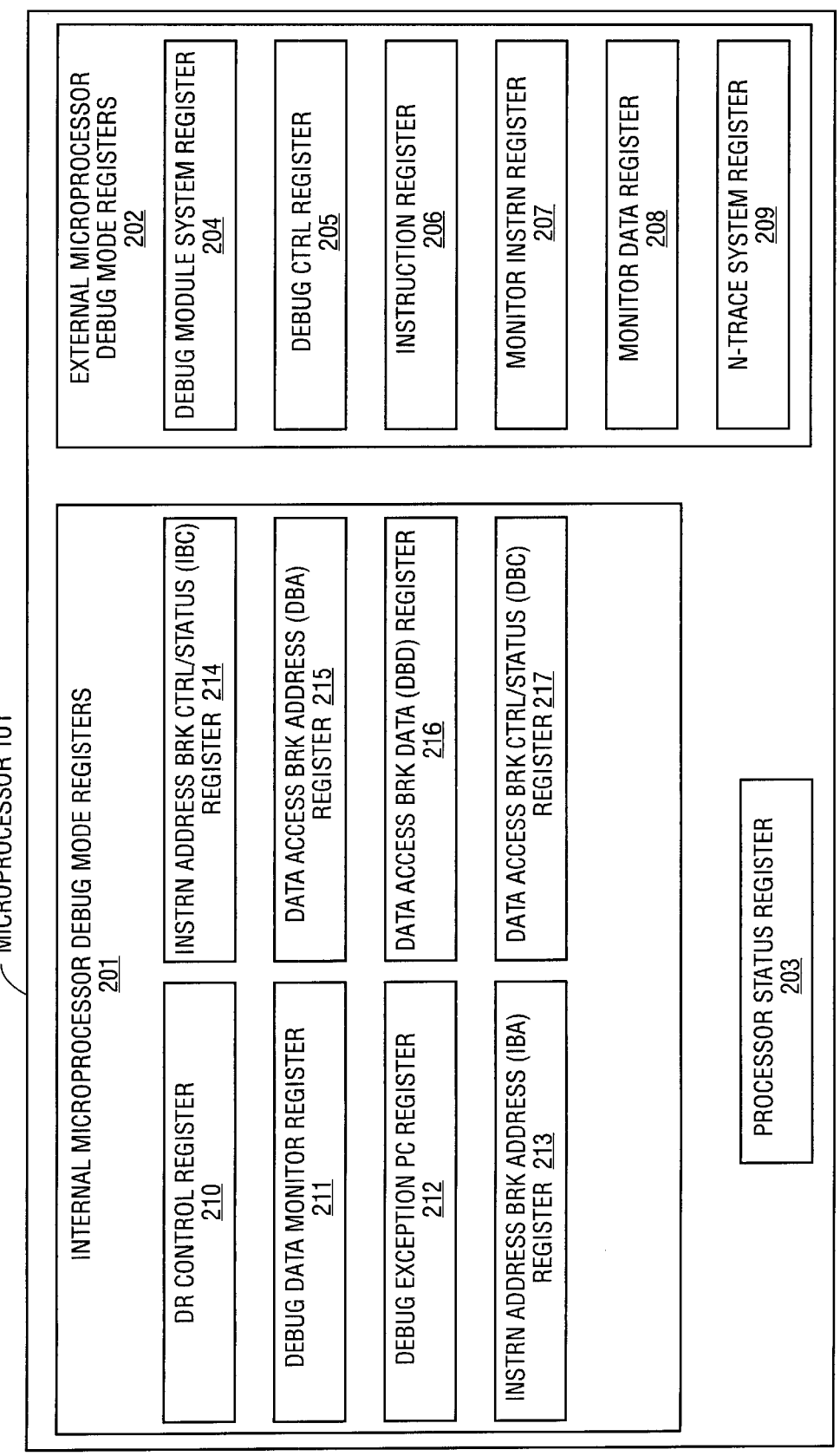
FIG. 2 illustrates a microprocessor's register configuration for internal and external microprocessor debug operations.

FIG. 2 illustrates registers of the microprocessor 101 in more detail. In one embodiment, a series of debug registers are used to allow microprocessor 101 to access internal and external debugging operations. Internal microprocessor debug mode registers 201 are used to execute internal debugging operations and external microprocessor debug mode registers 202 are used to execute external debugging operations. In addition, processor status register 203 is used by both external and internal operations, as discussed in FIG. 3.

External microprocessor debug mode registers 202 include the following registers. Debug module system register 204 is used to control and indicate the status of debug module 102. For example, this register resets and un-resets the module, so as to move between internal and external debugging operations, respectively. In addition, this register is responsible for establishing the direction of the bi-directional BKTGIO pin 110, as well as indicating which event caused the break in normal microprocessor operation resulting in debug operation. Debug control register 205 is used to control transition between normal and debug microprocessor modes. For example, this register is used to break normal processor operation and enter debug operation, as well as resetting debug operation to regain normal processor operation. In addition, this register may allow microprocessor 101 to execute one or more normal mode instructions and then break back into debug mode. Instruction register 206 provides the operation code for the JTAG control logic. For example, depending on the code in this register, debug module 102 may be instructed to access debug module system register 204 or debug control register 205. Because JTAG accesses to microprocessor 101 resources are accessed via a monitor mechanism within the debug tool 112, monitor instruction register 207 and monitor data register 208 are typically necessary. Monitor instruction register 207 is used to insert monitor instructions into the processor, and monitor data register 208 contains the data associated with the information downloaded from the processor to be sent to the monitor mechanism. N-trace system register 209 is used to control debugging accomplished in accordance with N-trace protocol, as well as provide read only information consistent with microprocessor's 101 N-trace implementation parameters.

Internal microprocessor debug mode registers 201 include the following registers. DR control register 210 combines the functions from external microprocessor debug mode registers 202, debug module system register 204 and debug control register 205, into a single register that is accessible via internal debugging operations. Therefore, its function is analogous to those two external microprocessor debug registers. Similarly, debug data monitor register 211 is analogous to external microprocessor debug mode register 202 monitor data register 208, and is used for external debugging even when debug module 102 is in a state consistent with internal debugging operations. Debug exception PC register 212 is a read/write register that stores the address at which normal microprocessor operation may resume after exiting either internal or external debugging operations. As further explained in FIG. 4, the present invention allows an instruction, stored in an address (e.g., VAddress), to break microprocessor's 101 normal operation and execute debugging operation. Instruction address break address register 213 stores the address (e.g., VAddress) of the instruction address breakpoint and instruction address break control/status register 214 controls and provides status for the instruction address breakpoint. Also, as further explained in FIG. 4, the present invention allows data, stored in an address (e.g., VAddress), to break microprocessor's 101 normal operation and execute debugging operation. Data access break address register 215 stores the address (e.g., VAddress) of the data address breakpoint. Furthermore, the present invention also allows specified data values, when written or read by the processor, to break microprocessor's 101 normal operation and execute debugging operation. Data access break data register 216 stores these data values. Data access break control/status register 217 controls and provides status for both data access address and data breakpoint conditions, consistent with registers 215 and 216.

Figure 3:
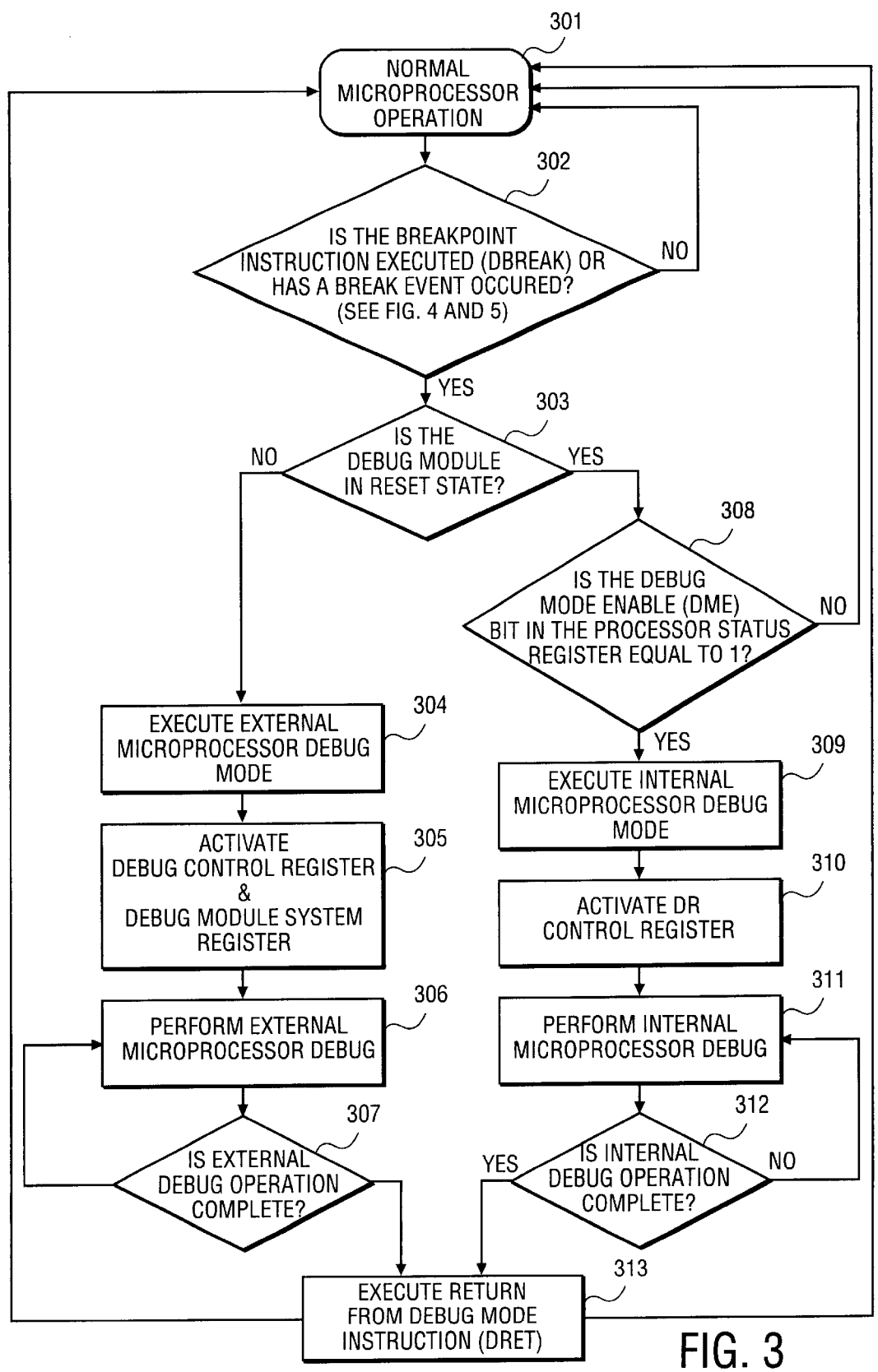
FIG. 3 illustrates a process flow for operating between normal and debug microprocessor operation.
Figure 4:
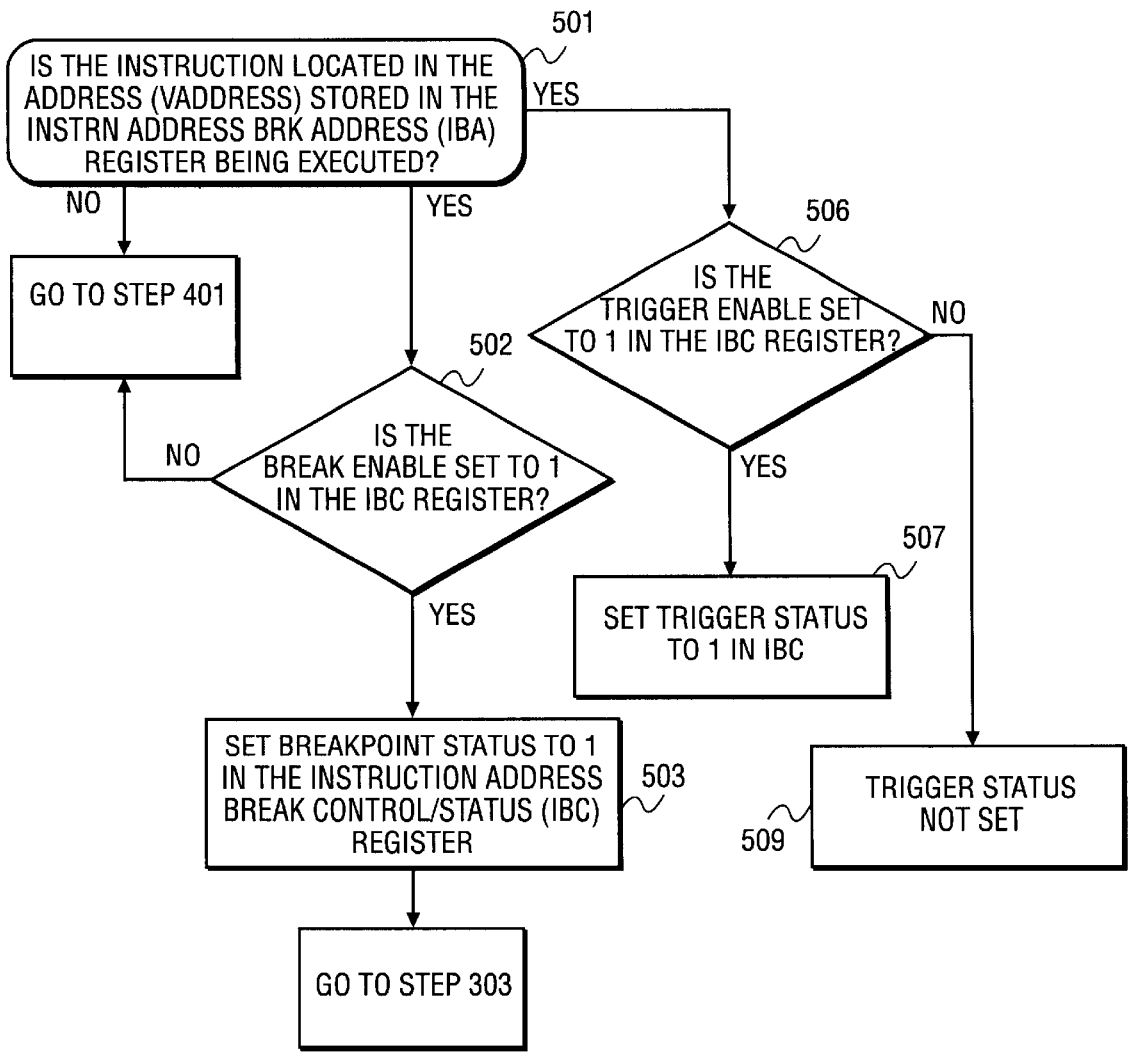
FIG. 4 illustrates a process flow for allowing an instruction to interrupt normal microprocessor operation and activate debug microprocessor operation.
Figure 5:
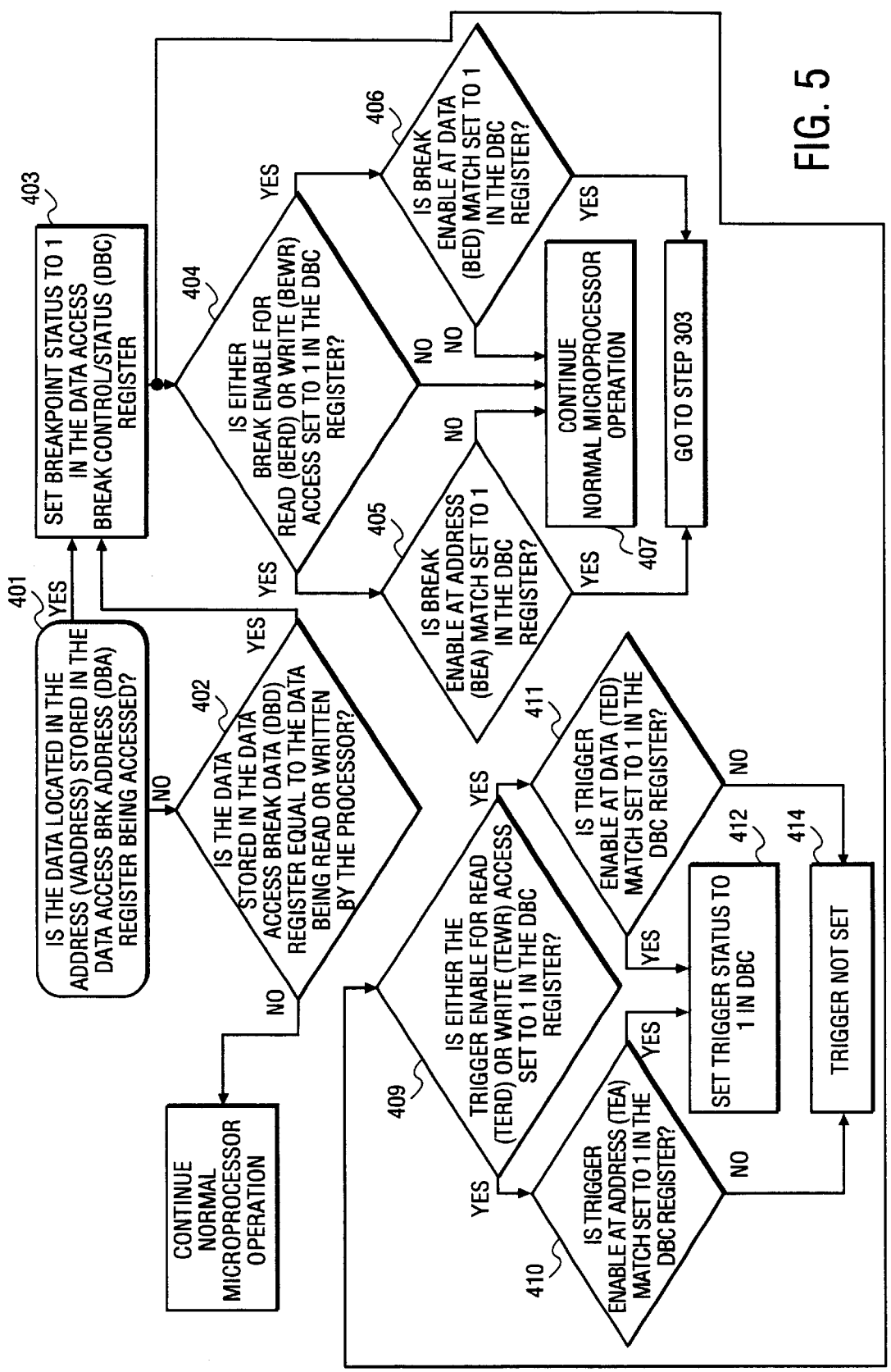
FIG. 5 illustrates a process flow for allowing data to interrupt normal microprocessor operation and activate debug microprocessor operation.

FIG. 3 illustrates a process flow for microprocessor's 101 normal and debug mode operation. The transition from normal to debug operation and back again begins with normal microprocessor operation 301. This step describes any processor operation not involving debugging. In order to leave normal microprocessor operation 301 and enter debug mode, step 302 requires a breakpoint instruction (e.g., DBREAK shown as an example in FIG. 3) or a break event condition. FIGS. 4 and 5 describe examples of two such break event conditions. Once the breakpoint instruction 302 has been executed or a break event occurs, microprocessor 101 next determines the state of debug module 102. If debug module 102 is not in a reset state, microprocessor 101 will output a trigger signal on BKTGIO 110 if enabled of test access port 105 and will prepare to begin to execute external microprocessor debug mode 304. Debug control register 205 and debug module system register 204 will be activated 305, and microprocessor 101 will perform external debugging operations 306. External microprocessor debugging operations will continue until completed 307.

Alternatively, if debug module 102 is in a reset state, microprocessor 101 begins to enter internal microprocessor debug mode by checking the status of the debug mode enable bit 308 in processor status register 203. The DME bit indicates to the processor whether there is an internal debugger program. Therefore, if the DME bit is set to 1, the processor will execute internal microprocessor debug mode 309, activate DR control register in step 310 and then perform internal microprocessor debugging operation 311. Internal microprocessor debugging operations will continue until completed 312. When either external 307 or internal debug operation 312 is complete, microprocessor 101 will execute a return from debug mode instruction (DRET) 313. DRET instruction 313 will allow microprocessor 101 to resume normal operation 301.

FIG. 4 illustrates an example of a process flow for allowing interruption of normal microprocessor operation and activation of debug microprocessor operation. This figure, along with FIG. 5, provides possible conditions, in one example of the invention, that will move microprocessor 101 from normal to debug mode.

FIG. 4 illustrates a process flow for allowing a specified instruction to interrupt normal microprocessor operation and activate debug microprocessor operation. Step 501 allows microprocessor 101 to enter debug mode if an instruction located in an address (i.e., VAddress), which is stored in instruction address break address (IBA) register 213, is being executed by microprocessor 101. If an instruction at this address is not being executed as determined in step 501, microprocessor 101 will go to step 401. However, if this address is being executed, the system will in step 502 check the "Break Enable" status of the IBC register 214 and if this Break Enable is set to 1 then the instruction address break control/status (IBC) register 214 will have its breakpoint status bit set to one in step 503 and the process moves to step 303. If, in step 502, it is determined that the "Break Enable" bit is not set to 1 then the process moves to step 401 of FIG. 5.

Concurrently with step 502, the process checks, in step 506, the Trigger Enable bit status to determine whether it is set to 1 in the IBC register 214. As with step 502, step 506 is entered from step 501 if the instruction at the address specified by the IBA register 213 is being executed (or is about to be executed). If, in step 506, it is determined that the Trigger Enable bit is set to 1, then the process moves to step 507 in which the Trigger status bit is set to 1. If, in step 506, it is determined that the Trigger Enable bit is not set to 1 then the process does not set the Trigger status bit to 1 (step 509).

FIG. 5 offers two potential situations that will invoke debug mode. First, step 401 allows microprocessor 101 to enter debug mode if data located in an address (i.e., VAddress), which is stored in data access break address (DBA) register 215, is being accessed by microprocessor 101. Second, step 402 allows microprocessor 101 to enter debug mode if data, stored in data access break data (DBD) register 216, is being accessed by microprocessor 101. If neither step 401 nor 402 is satisfied ("No") microprocessor 101 will go to step 301 (continue normal microprocessor operation). If either step 401 or 402 is satisfied ("Yes") data access break control/status (DBC) register 217 will set its breakpoint status bit to one in step 403. From step 403, the process proceeds concurrently through the two branches from step 403 as shown in FIG. 5.

At this point, depending on the status of DBC register 217, microprocessor 101 will either prepare to enter debug mode or continue normal microprocessor operation 407. For example, if either the break enable for read (BERD) bit or the break enable for write (BEWR) bit are set to one as determined in step 404, and if either break enable address (BEA) bit is set to one as determined in step 405 or break enable data (BED) bit is set to one as determined in step 406, then microprocessor 101 will go to step 303. On the other hand, if neither BEWR nor BERD are set to one, or if they are set to one, but neither BEA nor BED are set to one, then microprocessor 101 will continue normal operation in step 407 (in effect returning to step 301).

Also from step 403, microprocessor 101 will output a trigger signal on BKTGIO 110 of test access port 105, and prepare for external debugging operation 306, if the following conditions are met. First, either trigger enable for read (TERD) access or trigger enable for write (TEWR) access must be set to one as determined in step 409. Second, either trigger enable at address (TEA) match must be set to one as determined in step 410 or trigger enable at data (TED) match must be set to one as determined in step 411. If these conditions are met, step 412 will set the trigger status to 1 in the DBC (Step 412), allowing external debugging operation 306. However, if neither the first (as determined in step 409) nor the second (as determined in step 410 or as determined in step 411) conditions are met, the trigger status will not be set (step 414). Whether internal debugging or external debugging is selected, microprocessor 101 will move to step 303 of FIG. 3 and establish the state of debug module 102.

It will be appreciated that the foregoing provides particular examples of the present invention. Various modified versions of these examples and various other implementations may be implemented according to the present invention which is defined by the following claims. For example, a debug access method may use instruction fetching from main memory to cause the microprocessor to enter one debug mode (e.g. an internal debug mode controlled by stored software instructions which are decoded). In another alternative example, a fetched instruction may instruct the microprocessor to perform an internal debug mode as specified by stored software instructions or may instruct the microprocessor to perform an external debug mode which is controlled through an externally accessible dedicated test access port. In another alternative example, two debug access methods may be either instruction fetching or instruction jamming. In another alternative implementation, the debug registers may be accessed by accessing a register space (specified by an instruction operation code) or by accessing a memory mapped location.

What is claimed is:

1. A microprocessor comprising:
   a physical system interface coupled to connectors of said microprocessor for externally debugging said microprocessor;
   a programmable logic circuit which is coupled to a bus to receive software instructions which are decoded and executed for internally debugging said microprocessor; and
   a debug module coupled to said programmable logic circuit and said physical system interface.

2. The microprocessor of claim 1, wherein said debug module includes logic, wherein said logic selects between debugging controlled by said physical system interface and said programmable logic circuit and wherein said connectors comprise input/output connectors.

3. The microprocessor of claim 1, wherein said physical system interface comprises an access port, wherein said access port is compatible with IEEE 1149.1 test standard.

4. The microprocessor of claim 1, wherein said programmable logic circuit, said debug module, said bus and said physical system interface are disposed on a single semiconductor substrate as an integrated circuit.

5. The microprocessor of claim 1 wherein said programmable logic circuit comprises an instruction decoder which decodes said software instruction.

6. A method for performing a debugging operation with a microprocessor, said method comprising:
   interrupting normal microprocessor operation;

selecting between internal microprocessor debug mode and external microprocessor debug mode; and performing debug operations using said selected microprocessor debug mode.

7. The method of claim 6 further comprising the steps of:

interrupting said debug microprocessor operation; and resuming said normal microprocessor operation.

8. The method of claim 6, wherein said step of interrupting said normal microprocessor operation further comprises the steps of:

establishing a preset value;

determining a present value;

comparing said present value to said preset value; and interrupting normal microprocessor operation based on said comparing step.

9. The method of claim 8, wherein said preset value comprises an instruction stored in a predetermined address register, and wherein said present value comprises an executed instruction.

10. The method of claim 8, wherein said preset value comprises a data signal stored in a predetermined address.

11. The method of claim 10, wherein said present value comprises a data signal being read from said predetermined address.

12. The method of claim 10, wherein said present value comprises a data signal being written to said predetermined address.

13. The method of claim 6, wherein said step of selecting between internal microprocessor debug mode and external microprocessor debug mode further comprises the step of enabling a preset condition.

14. The method of claim 13, wherein if said preset condition places a debug module in a reset state, said internal microprocessor debug mode is selected.

15. The method of claim 13, wherein if said preset condition places said debug module in a non-reset signal, said external microprocessor debug mode is selected.

16. The method of claim 6, wherein said external microprocessor debug mode is performed with a dedicated test access port which is compatible with IEEE 1149.1 test standard.

17. The method of claim 6, wherein said normal microprocessor operation includes user, supervisor or kernel modes.

* * * * *